United States Patent [19]
Tomizawa et al.

[11] Patent Number: 5,740,725
[45] Date of Patent: Apr. 21, 1998

[54] WASTE PLASTICS COMPACTING APPARATUS

[75] Inventors: Takeshi Tomizawa; Kunihiro Ukai, both of Ikoma; Tatsuo Fujita, Osaka; Jiro Suzuki, Nara, all of Japan

[73] Assignee: Matsushita Electric Industrial Co., Ltd., Osaka, Japan

[21] Appl. No.: 622,808

[22] Filed: Mar. 27, 1996

[30] Foreign Application Priority Data

| Mar. 27, 1995 | [JP] | Japan | 7-067755 |
| Jul. 5, 1995 | [JP] | Japan | 7-169607 |
| Jul. 11, 1995 | [JP] | Japan | 7-175117 |
| Oct. 16, 1995 | [JP] | Japan | 7-267449 |

[51] Int. Cl.$^6$ ................................ B30B 15/34
[52] U.S. Cl. ............ 100/92; 100/245; 100/250; 100/269.04; 100/316; 425/384; 425/407; 425/DIG. 46
[58] Field of Search ............... 100/92, 315, 316, 100/211, 269.02–269.04, 240, 245, 248, 250, 101; 425/384, 407, DIG. 46

[56] References Cited

U.S. PATENT DOCUMENTS

| 242,554 | 6/1881 | Neahous | 100/245 |
| 3,736,863 | 6/1973 | Brucker | 100/269.04 |
| 5,263,841 | 11/1993 | De Soet | 100/92 |
| 5,355,789 | 10/1994 | Suzuki et al. | |

FOREIGN PATENT DOCUMENTS

| 2567385 | 1/1986 | France | 100/211 |
| 549720 | 4/1932 | Germany | 100/250 |
| 56-160899 | 12/1981 | Japan | 100/269.04 |
| 5-104526 | 4/1993 | Japan | 100/92 |
| 7-137035 | 5/1995 | Japan . |
| 7-164442 | 6/1995 | Japan . |
| 7-227847 | 8/1995 | Japan . |
| 7-227848 | 8/1995 | Japan . |
| 88/09264 | 12/1988 | WIPO . |

Primary Examiner—Stephen F. Gerrity
Attorney, Agent, or Firm—Ratner & Prestia

[57] ABSTRACT

A waste plastics compacting apparatus has a tubular accommodating container for accommodating waste plastics, a bottom plate sliding up and down inside of the accommodating container for varying an inner volume of said accommodating container, a bag provided beneath said bottom plate, an air pump for inflating or deflating said bag, an outer container provided outside of said accommodating container, a lid for loading and unloading the waste plastics provided above said accommodating container, and a hot air generating part having a heater and a blower.

22 Claims, 13 Drawing Sheets

WASTE PLASTICS COMPACTING APPARATUS

BACKGROUND OF THE INVENTION

1. Field of the Invention

The present invention relates to a relatively small-sized processing apparatus for easily compacting a variety of plastic refuse (waste plastics) such as plastic packing materials, packaging materials, food trays, and beverage containers occurring at homes, small offices, retail shops and others.

2. Description of the Related Prior Art

A huge volume of waste is discharged from the site of human activities such as homes, offices and shops, and shortage of treating facility capacity for incineration and land filling, and increasing treating cost including collection and transportation are posing serious social problems. As the countermeasure, it is essential to decrease the discharge quantity, but, on the other hand, it is extremely effective to utilize as resources by recycling. In particular, plastics occupy a large volume in the waste, and they do not rot and are made from petroleum which is a precious energy resource, and are hence regarded as the object of recycling, and studies have begun for this purpose. Waste plastics are small in bulk density, and the collection cost including transportation is high. In particular, this trend is manifest in beverage containers and foamed plastics. To promoter recycling of waste plastics, it is important to maintain an economical balance, and it is effective to reduce the volume at the originating place of waste plastics and save the transportation and collection cost.

As the conventional waste plastics compacting apparatus, an apparatus for crushing and cutting mechanically to reduce the volume, an apparatus for compressing mechanically, and an apparatus for crushing mechanically and melting by friction heat have been devised, among others. These apparatuses are large in treating capacity, but huge in size, and expensive, and are often installed in regeneration plants and the like, and not suited to stores or the like in which only a small quantity occurs dispersedly. Therefore, they cannot contribute to saving of transportation and collection expenses.

As a method suitable to the purpose of small disperse treatment, for example, as disclosed in U.S. Pat. No. 5,355,789, it is proposed to reduce the volume by heating plastics at low temperature and compressing at low pressure. This method is simple in the apparatus constitution as compared with the conventional system, and is suited to the apparatus for small disperse treatment. By operating such small-sized machines at waste plastics discharge sites or at easily collecting places, and transporting to the regeneration plants after reducing the volume, the recycling cost can be saved, and the economy can be enhanced, so that recycling can be activated and promoted. More convenient and practical methods belonging to this category are demanded from the viewpoint of promotion of recycling.

In the heating or heating and compressing method capable of reducing the size of apparatus, it is designed to heat at low temperature as far as possible in order to suppress generation of degeneration gas or smell during heating. Among waste plastics, however, lots of foamed and molded plastics (in particular, foamed polystyrene) are contained, and foaming gas at high concentration is generate while heating them. For example, foamed polystyrene generates a large volume of foaming gas such as butane and cyclohexane remaining therein in the heating and shrinking process. As a result, the gas generated in the treating container approaches the flammable limit concentration, and it is had to keep safety of the equipment. Moreover, the gas generated during heating contains many smelling substances such as styrene monomer, and a secure deodorizing method for them has been demanded at the same time.

In the heating and compressing method of waste plastics, in order to have the volume reducing effect as much as possible, it is necessary to heat the waste plastics in the treating container uniformly above the glass transition temperature. However, in the case of plastics which are increased in strength by heating as the crystallization is advanced, such as PET (polyethylene terephthalate) bottles, in particular, if heated nonuniformly, the portions below the glass transition temperature and crystallized portions by excessive heating coexist, and sufficient compression and compaction were difficult. To compress sufficiently even in such nonuniform heated state, a greater compressive force is needed, which gives rise to other problems of increases of apparatus size and rise of cost.

In the hitherto proposed compacting apparatus, there were also following problems. One is malfunction. In the compression operation, foamed polystyrene charged into the treating container was caught in the sliding parts, if only very rarely. The cause of heightening of surface adhesion due to softening of the heated foamed polystyrene. When foamed polystyrene is heated, the volume begins to decrease gradually around 100° C. and above. This is because softening begins as the polystyrene is heated above the glass transition temperature, and the entrapped foaming agent (gaseous substance such as hydrocarbon) begins to be released. As the temperature further climbs up, the volume becomes much smaller, and around 150° C. the foaming agent is released almost completely, and the volume decrease stops. In this state, the foamed polystyrene is advanced in softening, and the surface is considerably adhesive. Accordingly, the surface sticks to the wall of the apparatus, and when compressive operation is started by sliding in this state, it is caught in the gap of the sliding parts, thereby leading to malfunction of sliding. If not so serious as to cause malfunction, it sticks to the upper and lower compression surfaces, and it is difficult to take out after compressing and compacting.

SUMMARY OF THE INVENTION

To solve the above problems, it is hence a primary object of the invention to present a treating apparatus capable of reducing the volume at originating place of waste plastics by simple constitution and easy operation, to treat waste plastics occurring at homes, offices and shops.

A waste plastics compacting apparatus of the present invention comprises

- a tubular accommodating container for accommodating waste plastics,
- a bottom plate sliding up and down inside of said accommodating container for varying an inner volume of said accommodating container,
- a bag provided beneath said bottom plate,
- an air pump for inflating or deflating said bag,
- an outer container provided outside of said accommodating container,
- a lid for loading and unloading the waste plastics provided above said accommodating container, and
- a hot air generating part having a heater and a blower.

In the waste plastics compacting apparatus,
a first opening is provided in an upper part of the accommodating container,
a second opening is provided at substantially same height of said first opening or beneath it, and
a hot air circulation passage is provided in which a hot air circulates by flowing in from the first opening in the upper part of the accommodating container toward a lower part in the accommodating container, and returning to said blower after once flowing out from the second opening into a hot air return route formed between said accommodating container and said outer container.

In the waste plastics compacting apparatus,
at least the second opening consists of plural openings, and
said plural openings distribute downward from substantially same height as said first opening.

In the waste plastics compacting apparatus,
all or some of the second openings are formed in the bottom plate of the accommodating container, and
at least part of the hot air passes through the second opening of the bottom plate.

In the waste plastics compacting apparatus
a bypass passage for communicating between a positive pressure portion and a negative pressure portion of the hot air circulation passage is provided, and
a deodorizing unit is provided on said bypass passage.

In the waste plastics compacting apparatus
a deodorizing unit is provided on a branch route branched off from a positive pressure portion of the hot air circulation passage,
a downstream side of the deodorizing unit is opened to an atmosphere, and
an air suction port is provided at a negative pressure portion of said hot air circulation passage.

In the waste plastics compacting apparatus
a deodorizing unit and a suction blower are provided on a branch route branched off from the hot air circulation route,
a downstream side thereof is opened to an atmosphere, and
an air suction port is provided in a negative pressure portion of said hot air circulation route.

In the waste plastics compacting apparatus
a bypass passage communicating between a positive pressure portion and a negative pressure portion of the hot air circulation passage,
a deodorizing unit and a blower are provided on said bypass passage, and
said blower blows out to said positive pressure portion.

In the waste plastics compacting apparatus
a downstream side passage of the deodorizing unit opens to an atmosphere through the hot air generating part.

In the waste plastics compacting apparatus
a downstream side passage of the deodorizing unit opens to an atmosphere and the hot air generating part.

A waste plastics compacting apparatus of the present invention comprises
a tubular accommodating container for accommodating waste plastics,
a bottom plate sliding up and down inside of said accommodating container for varying an inner volume of said accommodating container,
a bag provided beneath said bottom plate,
an air pump for inflating or deflating said bag,
an outer container provided outside of said accommodating container,
a lid for loading and unloading the waste plastics provided above said accommodating container, and
a hot air generating part having a heater and a blower, wherein
hot air is blown out from an opening of the accommodating container in a circumferential direction along an inner side of said accommodating container.

In the waste plastics compacting apparatus
a passage of said hot air reaching up to the opening is formed along a tangent line of the circumference of the accommodating container.

In the waste plastics compacting apparatus
the first opening is provided at the upper side of said accommodating container, and at least part of said second openings is provided at the upper side of said accommodating container, and
heating process by hot air and compressing process by the air pump are started simultaneously.

In the waste plastics compacting apparatus
the upper second opening is disposed at a position confronting the first opening.

In the waste plastics compacting apparatus
said hot air generating part heats the waste plastics accommodated in the accommodating container,
the air pump compacts the heated waste plastics by varying the inner volume of said accommodating container, and
a cooling of the waste plastics is executed for a short time after the ending of said heating and before the starting of said compacting.

In the waste plastics compacting apparatus
said hot air generating part heats the waste plastics accommodated in the accommodating container,
the air pump compacts the heated waste plastics by varying the inner volume of said accommodating container, and
a temperature increase on a basis on said heating is raised as being divided into plural steps.

In the waste plastics compacting apparatus
a cooling of the waste plastics is executed for a short time after the ending of said heating and before the starting of said compacting.

In the waste plastics compacting apparatus
the blower in the hot air generating part is operated for said cooling.

The waste plastics compacting apparatus further comprises
temperature detecting means for detecting hot air, provided in said hot air circulating passage,
an exhaust route branched off from said hot air circulating passage, and
a fresh air intake port for taking in fresh air into said hot air circulating passage, wherein
a volume corresponding to an air volume taken in from the fresh air intake port is exhausted from the exhaust route, and at least one of the fresh air intake volume and the heating quantity by the hot air generating part is varied depending on the detected temperature of the hot air by the temperature detecting means.

In the waste plastics compacting apparatus
the fresh air intake volume increases or the heating quantity of the hot air generating part decreases, as the detected temperature of the hot air increases.

The waste plastics compacting apparatus further comprises an exhaust route branched off from said hot air circulating passage and having a deodorizing unit containing an oxidation catalyst, second temperature detecting means for detecting the temperature of said deodorizing unit, and a fresh air intake port for taking in fresh air into said hot air circulating passage, wherein a volume corresponding to the air volume taken in from the fresh air intake port is exhausted from the exhaust route, and at least one of the fresh air intake volume and the heating quantity in said hot air generating part is varied depending on the detected temperature of the deodorizing unit by said second temperature detecting means.

In the waste plastics compacting apparatus
the fresh air intake volume increases or the heating quantity of said hot air generating part decreases, as the detected temperature of the deodorizing unit increases.

The invention presents an apparatus for reducing the volume of waste plastics easily and hygienically without causing trouble, by a mechanism of sliding a movable plate installed in a tubular container by vary the volume of a bag disposed in the lower part thereof by an air pump, particularly having a feature in the inner volume variable structure. That is, to compress and compact the waste plastics put is an accommodating container, the accommodating container having a variable inner volume is operated by force by using air pressure, and the inner volume is reduced to compress the waste plastics contained therein. The waste plastics are easily compressed as the inner volume in the accommodating container varies, and the volume is reduced significantly. This compression stroke can be easily repeated plural times during treatment. In this way, the waste plastics can be easily reduced in volume by heating and compressing, while the waste plastics are sterilized by heating, and therefore, while the storing place is saved in space, malodor is not released during storage and the sanitation is enhanced.

Moreover, by installing a deodorizing system in the route branched off from the hot air circulation route for heating, various waste plastics can be reduced in volume easily and comfortably without release of smell during treatment.

Besides, foamed plastics generating a huge volume of decomposition gas during heating can be also reduced in volume by heating easily and safely.

To reduce the volume of foamed plastics, heating is over the glass transition temperature, but in order to suppress gas generated during treatment and prevent sticking to equipment due to melting, it is designed to heat by controlling the hot air below the melting temperature. As heating progresses, the foamed plastics shrink by heat, and foaming gas is generated massively in this process. In particular, when treating foamed polystyrene, it causes to release foaming gas such as butane and cyclohexane, foaming aid such as toluene and ethyl benzene, and residual gas component such as styrene monomer.

In the apparatus of the invention, by making use of the blow-out pressure of blower for heating, or using an exclusive blower for catalyst, part of hot air containing gas components is sequentially sent into the catalyst deodorizer, and the has is decomposed to be harmless by contact oxidation reaction. At this time, the exhaust or waste heat is put back into the hot air circulation route, and the reaction heat is utilized for heating of waste plastics, so that energy in reducing volume is saved.

Or, when an air intake port is provided in a negative pressure portion of the hot air circulation route formed by operating pressure of the blower for heating, a sufficient air necessary for oxidation reaction of generated gas can be taken in from the atmosphere without requiring blower for catalyst. At this time, by forming an exhaust port in a positive pressure portion of the hot air circulation route, an emission suited to an intake can be maintained. When a catalyst deodorizing unit is installed in the emission route, a simple constitution is realized.

In this way, the gas generated at the time of heating of waste plastics can be decomposed effectively, and safety in volume reducing treatment can be maintained. At the same time, by using the energy generated at the time of gas treatment for heating, energy can be saved in treatment.

Moreover, by blowing out hot air in the circumferential direction along the inner side of the accommodating container so as to form the passage of hot air up to this point along the tangent of the circumference of the accommodating container, it is possible to form a vortex of hot air in the accommodating container, and uniformity of heating of waste plastics is enhanced. As a result, preventing partial crystallization or melting of the waste plastics during treatment, it is possible to reduce volume effectively.

The above procedure is particularly effective for foamed polystyrene, but when reducing the volume of waste plastics by heating and compressing, by setting a cooling process for a short time between the end of heating and start of compression, the foamed styrene surface temperature can be slightly lowered during the short process of cooling, so that the surface adhesiveness can be lowered. As a result, the waste plastics in the treating container will not stick to the wall of the treating container or upper and lower compressing surfaces, so that a smooth compressive operation may be realized.

Still more, in a series of volume reducing process from heating to compressing, by heating by dividing the heating setting temperature in plural steps, or by transferring to compressing process after heating, abrupt elevation of concentration of generated gas of foaming agent and others by heating can be suppressed, and risk of explosion or the like is prevented, so that safe volume reducing process may be realized. Gas generation during heating occurs suddenly between 100° C. and 150° C., but by raising the temperature by a moderate heating in this temperature zone, elevation of gas concentration in the equipment may be moderate. In particular, in the constitution for taking the fresh air into the treating container and exhausting an equivalent amount of intake, while the elevation of gas concentration in the equipment may be moderate as mentioned above, fresh air is introduced to lower the internal gas concentration, and the risk of explosion by ignition or sparking may be avoided. In addition, setting of a cooling process for a short time between the end of heating and start of compressing contributes to alleviation of elevation of gas concentration in the equipment.

Or, depending on the detected temperature of hot air, by varying at least one of fresh air intake volume and heating capacity of hot air feed route, sudden concentration elevation of generated gas of foaming agent or the like due to heating is suppressed, and risk of explosion or the like is prevented, thereby making it possible to reduce the volume safely.

Besides, corresponding to the detected temperature of hot air, by making variable at least one of fresh air intake volume and heating volume of hot air feed route, same as mentioned above, sudden concentration hike of generated gas of foaming agent or the like can be suppressed, risk of explosion or the like can be prevented, and safe volume reducing treatment is possible. This is to make use of the phenomenon of activation of oxidation reaction in the catalyst layer as the gas generation increases suddenly and elevation of catalyst temperature by heat generation.

PREFERRED EMBODIMENTS OF THE INVENTION

Figure 1:
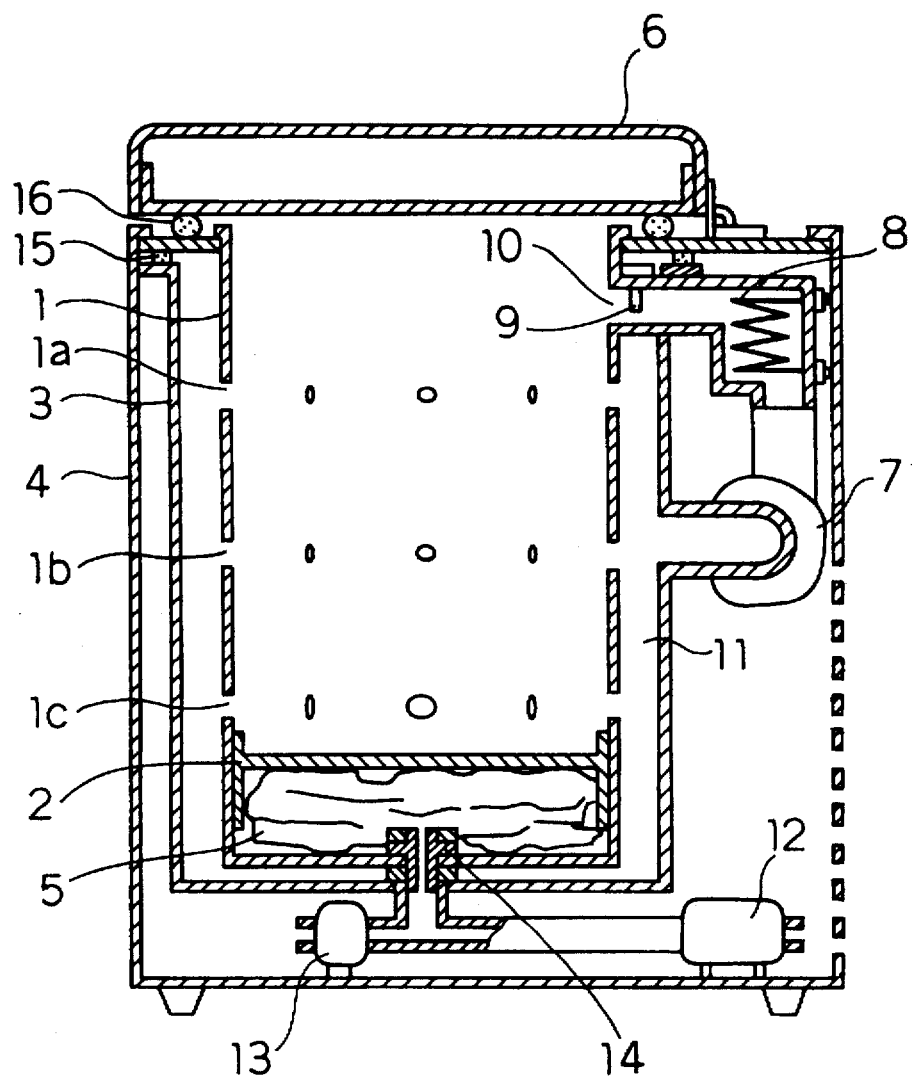
FIG. 1 is an essential longitudinal sectional view of a waste plastics compacting apparatus in an embodiment of the invention.

Referring now to the drawings, some of the preferred embodiments of the invention are described in detail below.

FIG. 1 shows an essential longitudinal sectional view of an embodiment of the invention. Reference numeral 1 is a tubular accommodating container for receiving waste plastics, 2 is a bottom plate slidable up and down along its inner wall, 3 is an outer container, and 4 is an outer casing. In the lower part of the outer container 3, there is an airtight bag composed of heat resistant plastic material, and 12 is an air pump for sending air into the bag 5, and 13 is a solenoid valve for releasing the air in the bag 5. Reference numeral 14 is a clasp of the bag 5, and the bag 5 is fixed to the lower part of the accommodating container 1. Reference numeral 6 is a lid for loading and unloading waste plastics, and it is fixed with the main body through a lid packing 16. Reference numeral 15 is an outer container packing. Reference numeral 7 is a blower, and 8 is a heater, and both are combined to compose a hot air generating unit. The hot air generating unit can be provided within the lid, but in such a case the lid becomes heavy, and spring or other assisting tool may be needed for opening and closing the lid. As in this embodiment, when provided at the side of the accommodating container 1, the, weight of the lid can be reduced, and ease of handling is enhanced, while the temperature rise of the lid can be prevented and the safety may be enhanced. Reference numeral 9 is a temperature detecting unit of hot air, and the hot air temperature is controlled on the basis of the signal therefrom. Reference numeral 10 is a first opening composed in the upper part of the accommodating container 1, and 1a, 1b, 1c are a plurality of second openings composed in the accommodating container 1. The second opening may be only one, but the arrangement in plurality is more practical because there is only small effect of heating fluctuation due to manner of loading of waste plastics. Reference numeral 11 is a hot air return route formed between the accommodating container 1 and outer container 3.

The operation is described below. By opening the lid 6, waste plastics are put into the accommodating container 1. Although it is possible to reduce the volume by mixing various plastics, it is more preferable from the viewpoint of recycling to treat separately or use exclusive machines for each type. By closing the lid 6, consequently, heating is started by feeding power to the blower 7 and heater 8. The heating temperature is automatically controlled at a set temperature by a controller (not shown) on the basis of the signal from the temperature detecting unit 9 installed at the blow outlet of hot air. The hot air is blown into the accommodating container 1 from the first opening 10, and heats the internal waste plastics. Then, from the second openings 1a to 1b, the hot air is fed into the hot air return route 11, and heats the waste plastics while circulating in the machine in the passage returning to the suction side of the blower 7. The heating temperature may be varied depending on the type of waste plastics, but it is preferred generally in a range of 100° to 200° C. After the internal waste plastics are sufficiently heated, the operation advances to next compressing process. For compression, air pressure is utilized. When the air pump 12 is put into operation by closing the solenoid valve 13, the air is fed into the bag 5, and the bag 5 begins to be inflated. By this pressure, the bottom plate 2 is pushed up along the inner surface of the accommodating container 1, and the waste plastics are compressed. Finally, waste plastics are compressed between the bottom plate 2 and lower surface of the lid 6, and the volume is reduced. The compressive force is indicated by the product of the air pressure and area of the bottom plate 2. Supposing the air pressure to be 0.1 kg/cm$^2$ and the area of the bottom plate 2 to be 1000 cm$^2$, 100 kg is obtained as a compressive force. The pressure of the air for compression is sufficient at about 0.3 kg/cm$^2$ at maximum, and to use higher pressure, the mechanical strength of the lid 6 and other parts must be increased, which causes to increase the cost. When compression is over, by opening the solenoid valve 13, the compressed air in the bag 5 is exhausted. The bottom plate 2 comes down by its own weight and the weight of waste plastics. When taking out the waste plastics after treatment, it is convenient to keep the bag 5 inflated. When treating continuously without taking out, it is better to lower the bottom plate 2. In this way, various waste plastics put into the accommodating container are reduced in volume.

Figure 2:
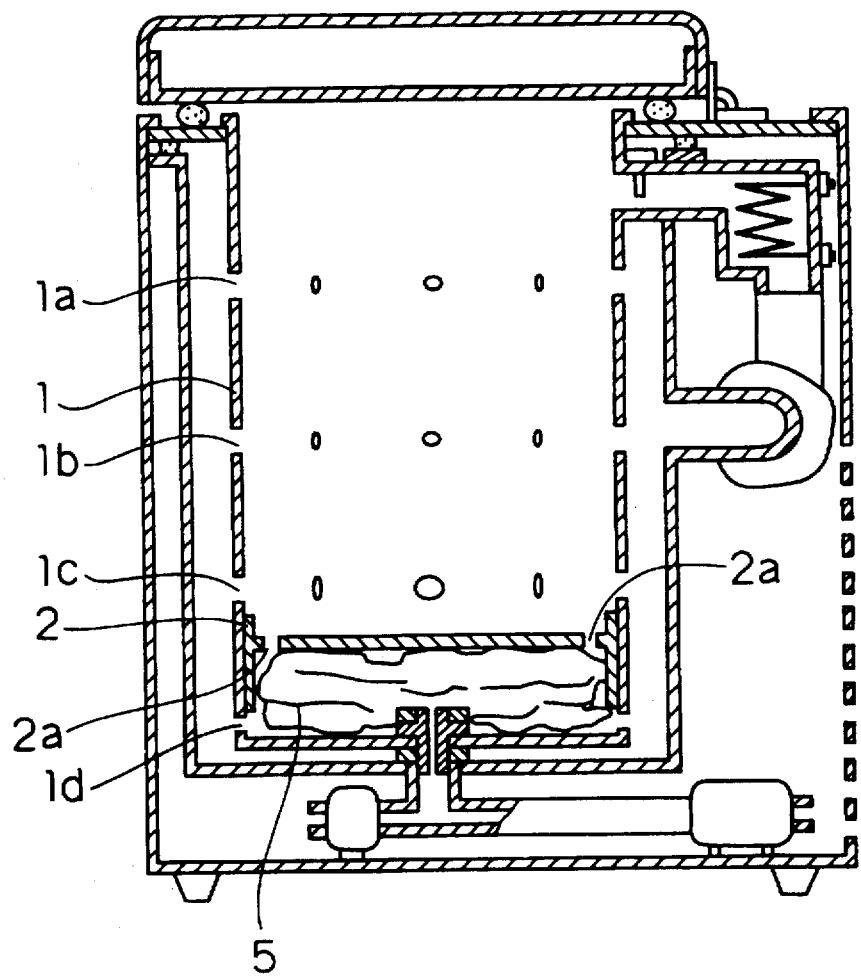
FIG. 2 is an essential longitudinal sectional view of a waste plastics compacting apparatus in other embodiment of the invention.

FIG. 2 shows an improvement of circulation passage in the embodiment shown in FIG. 1 in order to heat more effectively. Common elements are identified with same reference numerals, and only essential parts are indicated by numerals. In addition to the plurality of second openings 1a to 1c provided in the wall of the accommodating container 1, a plurality of 1d are further added in this embodiment. In the bottom of the bottom plate 2, a plurality of bottom plate openings 2a are provided, too. In this constitution, the opening area of the passage from the accommodating container 1 to the blower 7 increases, and the flow passage resistance decreases, so that heating may be done more smoothly. At this time it is more easy to short-circuit the flow passage and more effective to form the bottom plate openings 2a near the edge of the bottom side.

Figure 3:
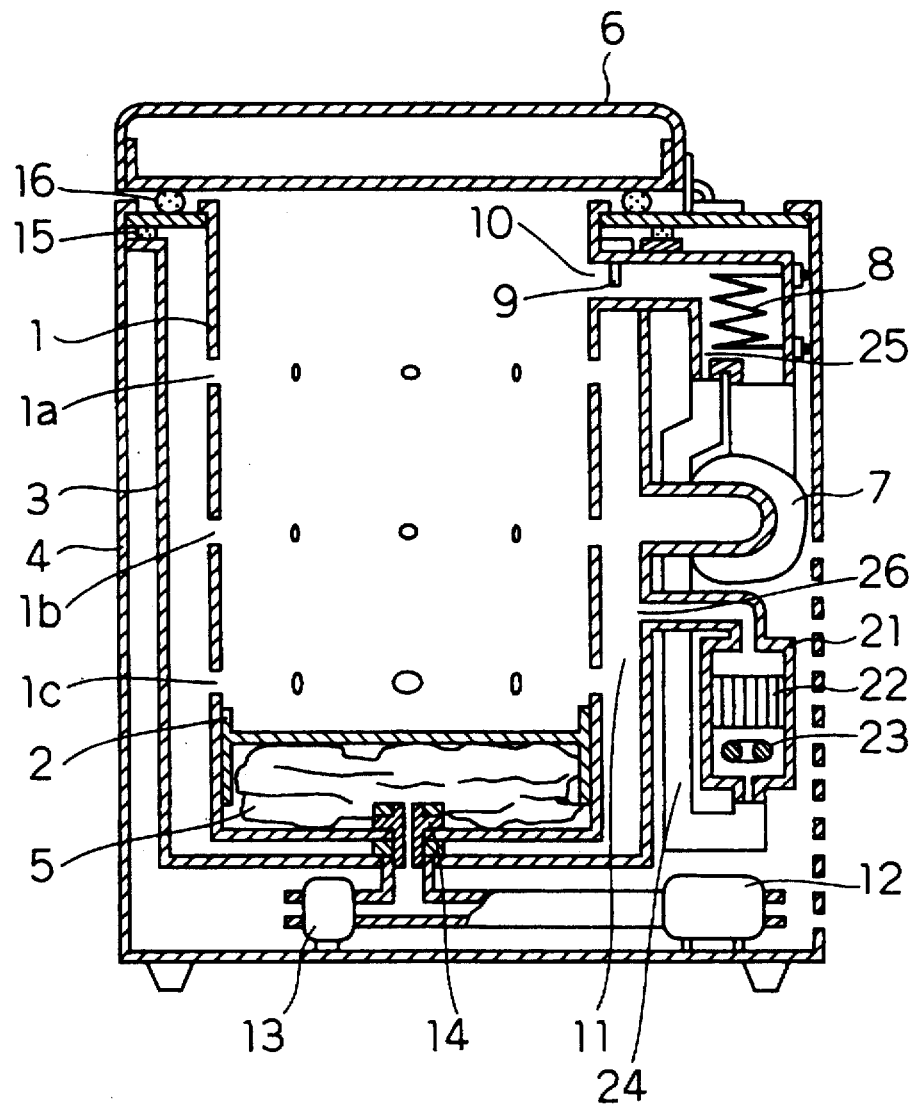
FIG. 3 is an essential longitudinal sectional view of a waste plastics compacting apparatus in other embodiment of the invention.

FIG. 3 shows an essential longitudinal sectional view of a different embodiment of the invention. Elements common to FIG. 1 are identified with same reference numerals, and explanations are omitted. The location of installation of the heater 8 is the blow-out side of the blower 7, and hence the pressure is positive, while the hot air return route 11 is in a negative pressure state because it is at the suction side of the blower. From each place, a positive pressure side branching part 25 and a negative pressure part branching part 26 are composed, and the both are linked with a bypass passage 24, and a deodorizing unit 21 is installed on the passage. The deodorizing unit 21 is composed of a honeycomb oxidizing catalyst 22 and a catalyst heater 23 for activating the catalyst 22. The catalyst is composed by having a noble metal supported by a honeycomb ceramic carrier. By thus connecting, part of circulating hot air passes from the positive pressure branching part 25 to the deodorizing unit 21, and flows into the negative pressure branching part 26. The odor components generated in the process of heating at this time are oxidized and decomposed on the catalyst, and transformed into odorless substances. The flow rate of the bypass passage 24 may be set arbitrarily by the balance of the inside diameter of the passage and the pressure of the blower.

Figure 4:
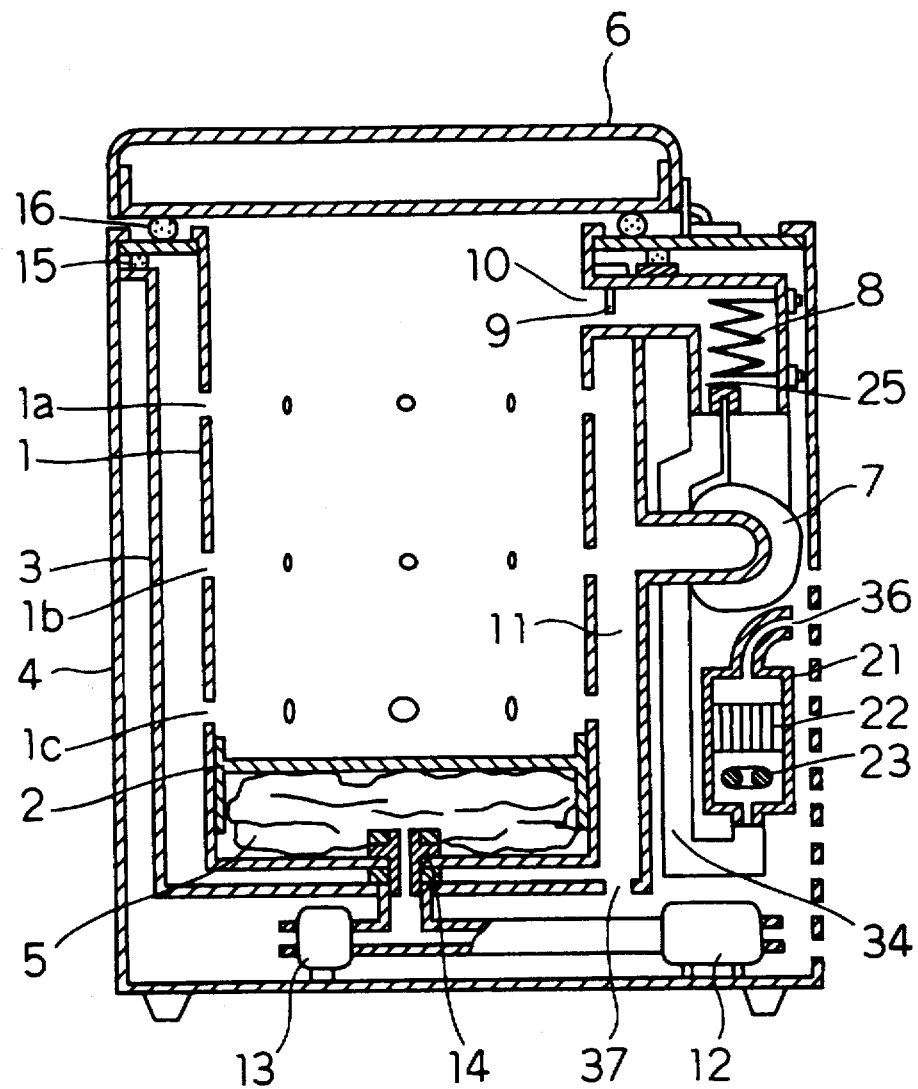
FIG. 4 is an essential longitudinal sectional view of a waste plastics compacting apparatus in other embodiment of the invention.

FIG. 4 shows an essential longitudinal sectional view of other embodiment of the invention. The same parts as in the embodiments in FIG. 1 and FIG. 3 are identified with same reference numerals as in the drawings, and explanations are omitted. The deodorizing unit 21 is installed on the branching passage 34 from the positive pressure side branching part 25, same as in FIG. 3, and moreover the outlet of the deodorizing unit is an exhaust port 36 opening to the atmosphere. In the hot air return route 11 at a negative pressure side, an air suction port 37 is provided. In this constitution, fresh air is always taken in from the air suction port 37 while heating, and an equivalent amount of air as the intake containing odor components is exhausted through the deodorizing unit. Therefore, smell is not generated while heating, and a comfortable operation is realized.

Figure 5:
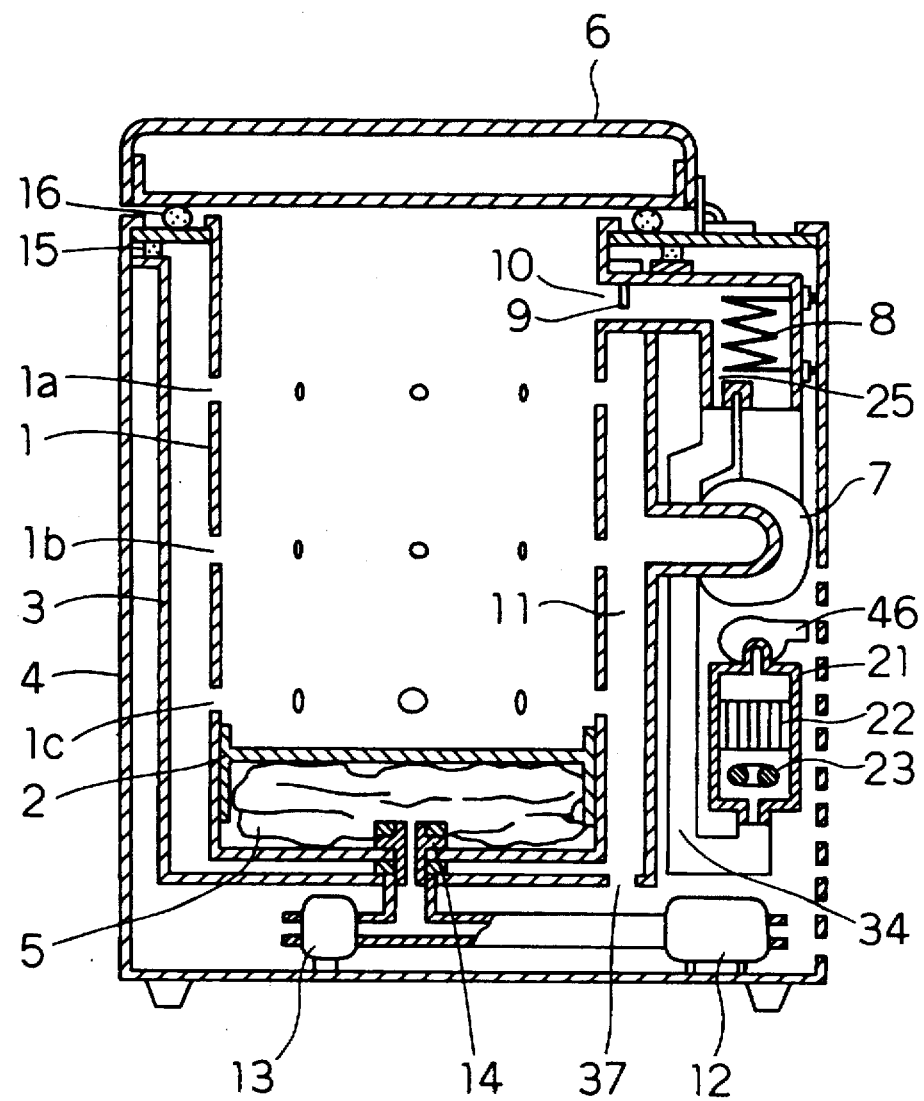
FIG. 5 is an essential longitudinal sectional view of a waste plastics compacting apparatus in other embodiment of the invention.

FIG. 5 shows an essential longitudinal sectional view of other embodiment of the invention. The same parts as in the embodiments in FIG. 1, FIG. 3 and FIG. 4 are identified with same reference numerals as in the drawings, and explanations are omitted. What differs from FIG. 4 is that a suction blower 46 is installed at the downstream side of the deodorizer in order to exhaust by force. By this suction operation, the entire internal space of the equipment tends to be at negative pressure side, and therefore if there is a gap in any part of the equipment and air tightness is spoiled, only the peripheral air is sucked into the equipment, and leak of smell from the equipment is very rare. Therefore, release of smell during heating seems to be practically none, and a comfortable odorless operation may be realized. In this case, moreover, forced suction is possible, and hence branching from the hot air circulation route may not be limited to the position of positive pressure side branching part 25 in FIG. 5, but it is possible to branch off from any position at the negative pressure side, which is advantageous from the view point that the degree of freedom of design, entire constitution and configuration may be enhanced.

It is also possible to combine the constitution of disposing the deodorizing unit shown in the embodiments in FIG. 3 to FIG. 5 and the constitution in FIG. 2, of course, and the heating performance is improved because of reduction of flow passage resistance, making it possible to reduce the volume in a short time.

In the foregoing embodiments, by organic coupling and ideal configuration of the own heating function and compressing function, waste plastics can be reduced in volume easily and hygienically. Waste plastics are particularly high in rigidity or flexibility, and it is hard to compress at ordinary temperature, but since they are easily softened by heating, it is afterwards easy to compress and compact, and the volume can be reduced to about $1/10$ to $1/40$ though variable depending on the type. Heating also provides sterilizing effects, and generation of malodor due to putrefaction during storage can be prevented. Hence, the storage space of waste plastics can be saved, smell during storage can be prevented, and volume of waste plastics at the originating place of waste plastics can be reduced, thereby making it possible to create public enterprise values of reduction of collection and transportation costs of waste plastics. Moreover, by using exclusive machines for individual types of waste plastics, it is possible to lower the transportation cost which is a major problem in recycling, and it contributes to promotion of refuse recycling. Furthermore, having the deodorizing unit, release of smell during treatment is prevented, and secondary pollution is prevented, so that the user can operate safely and comfortably.

Figure 6:
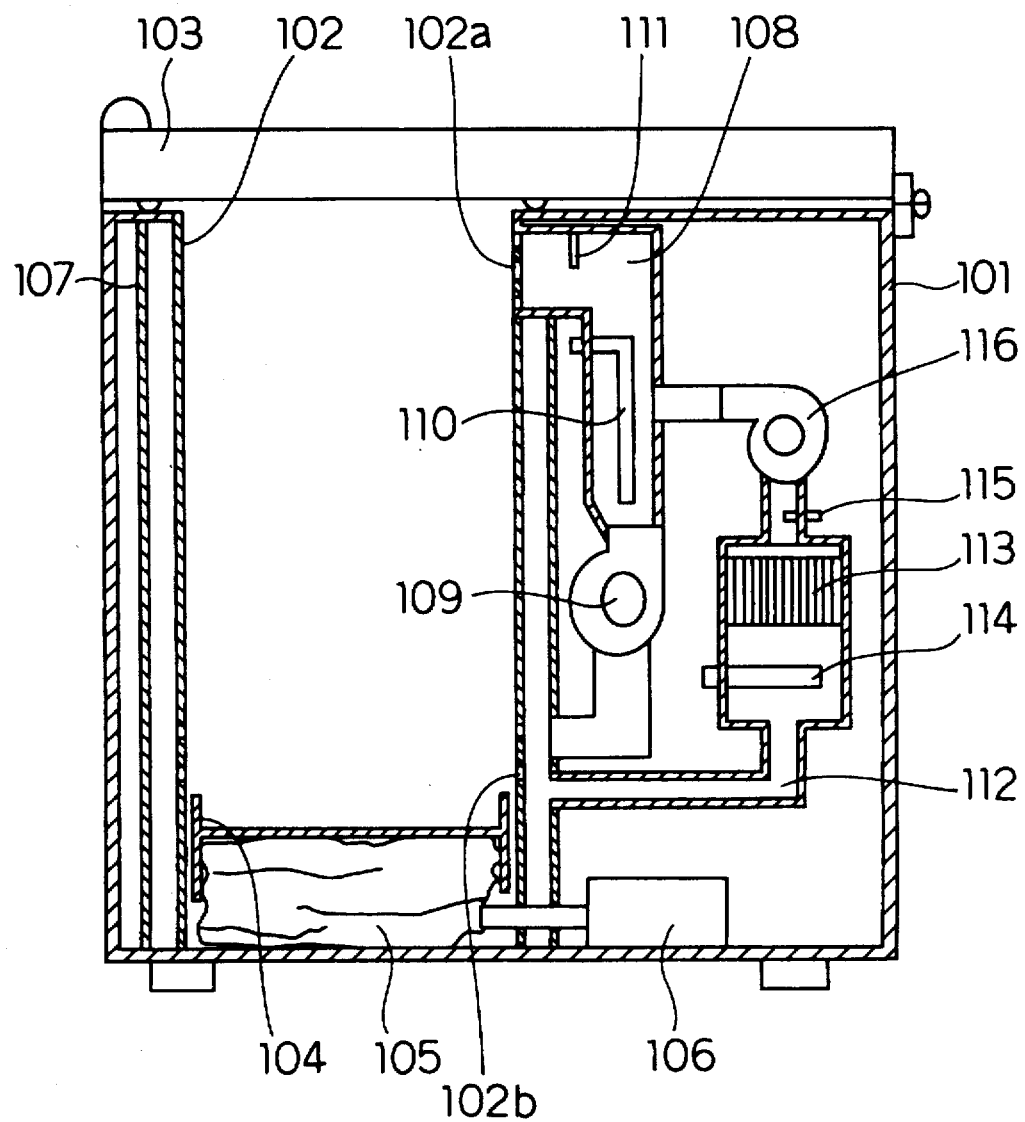
FIG. 6 is an essential longitudinal sectional view of a waste plastics compacting apparatus in other embodiment of the invention.

FIG. 6 is an essential longitudinal sectional view showing an embodiment of a compacting apparatus of the invention.

Reference numeral 101 shows the main body, which comprises a tubular accommodating container 102 for accommodating waste plastics to be treated, hot air feed route for feeding hot air into the accommodating container 102 and other in its inside, and also a lid 103 for hermetically closing the upper opening of the accommodating container 102 in its upper part. Inside the accommodating container 102, there is a bottom plate 103 sliding up and down its inner wall, and also an airtight bag 105 is provided. An air pump 106 is coupled to the bag 105, and by inflating the bag 105 at air pressure, the bottom plate 104 is raised, and by exhausting the bag, the bottom plate 104 is lowered. At the outer side of the accommodating container 103, an outer container 107 is provided, and a blower 109, a heater 110 (both composing a hot air generation unit) and a hot air feed route 108 incorporating a temperature detector 111 are provided at its side. This hot air feed route 108 is coupled to the first opening 102a having a hot air feed port provided at the upper side of the accommodating container 102, and its intake port is opened to the outer container 107 adjacently to the second openings 102b beneath the accommodating container 102. Parallel to the blower 109, a deodorizing route 112 having a deodorizing unit 113 is provided. The deodorizing unit 113 is composed of oxidation catalyst, catalyst heater 114, temperature detector 115, and catalyst blower 116.

The operation is nearly same as in the foregoing embodiments, except that the catalyst blower 116 is used exclusively for feeding gas into the deodorizing unit 113. Using the exclusive blower, regardless of the quantity and state of the waste plastics to be treated, it is possible to keep a specific air feed rate, and an adequate deodorizing performance can be exhibited. That is, the catalyst setting condition is constant, and therefore a stable catalyst generated gas purifying performance can be exhibited. Besides, by constituting so as to return the exhaust after passing through the catalyst to the hot air circulation route, the energy of treatment can be saved.

Figure 7:
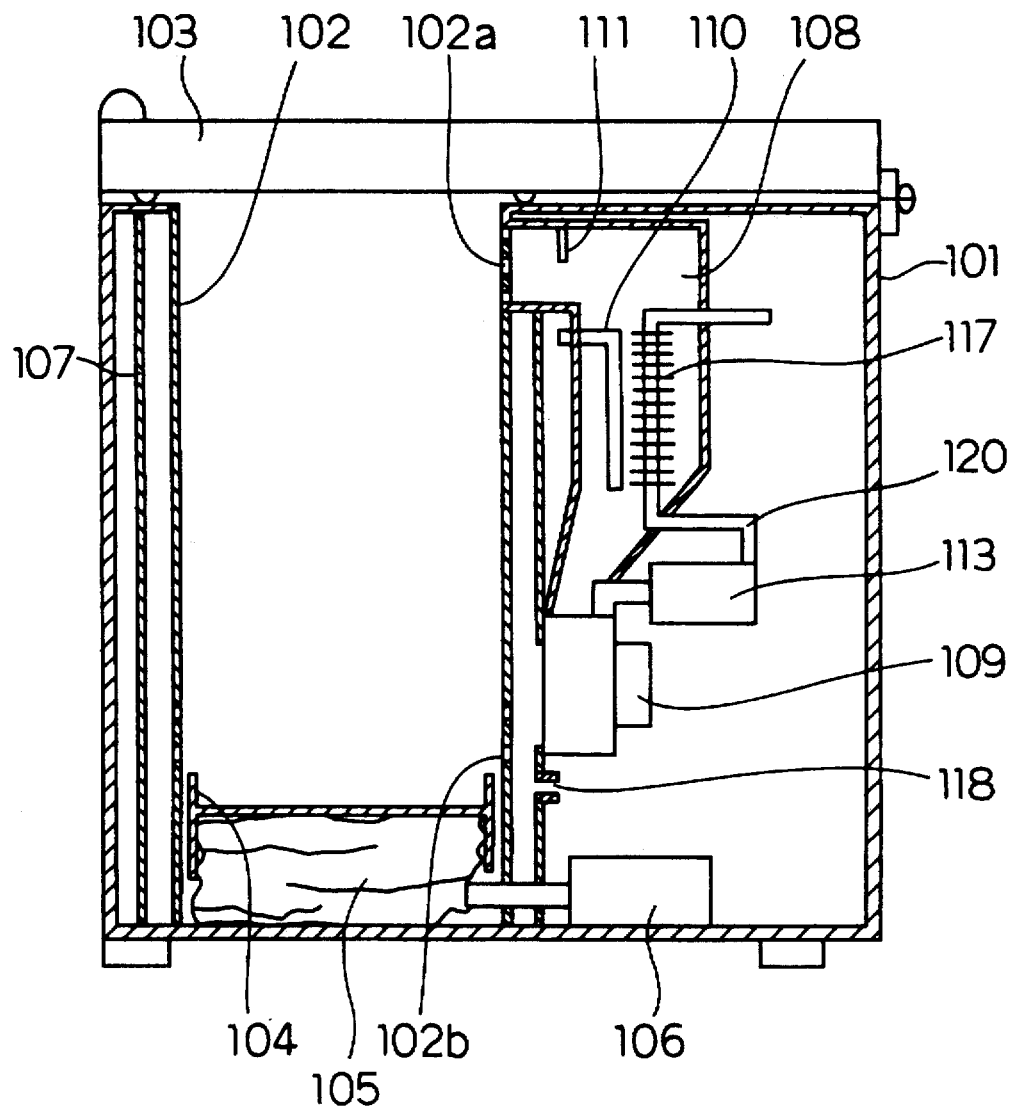
FIG. 7 is an essential longitudinal sectional view of a waste plastics compacting apparatus in other embodiment of the invention.

FIG. 7 is an essential longitudinal sectional view of other embodiment of the invention. What differs from FIG. 6 is that an air intake port 118 is provided at the part of the outer container 107 where pressure is negative by the heating blower 109 in the hot air circulation route, and that the deodorizing unit is branched off at the downstream side of the blower 109 of the hot air feed route 108 to open the exhaust route 120 at the downstream side of the deodorizing unit 113 to the outside once through the hot air feed route 108. In addition, a heat exchange fin 117 is added to the portion located inside the hot air feed route 108 of the exhaust route 120, and the heat recovery rate from the exhaust after passing through the catalyst is enhanced.

For example, when the foamed polystyrene is heated, the generated gas concentration in the accommodating container is very high, and in the case of catalytic oxidation, oxygen corresponding to that concentration is needed, and introduction of fresh air is effective for this purpose. Besides, the reaction heat on the catalyst is also significant, and by passing the exhaust route through the hot air feed route, the heat in the exhaust after passing through the catalyst deodorizing unit can be recovered, and the energy can be saved. Incidentally, similar effects can be obtained by using an exclusive catalyst blower as shown in FIG. 6. The air intake port is not particularly specified as far s the pressure is negative, and it may be also located, for example, in the gap between the motor shaft of fan and the fan case.

Figure 8:
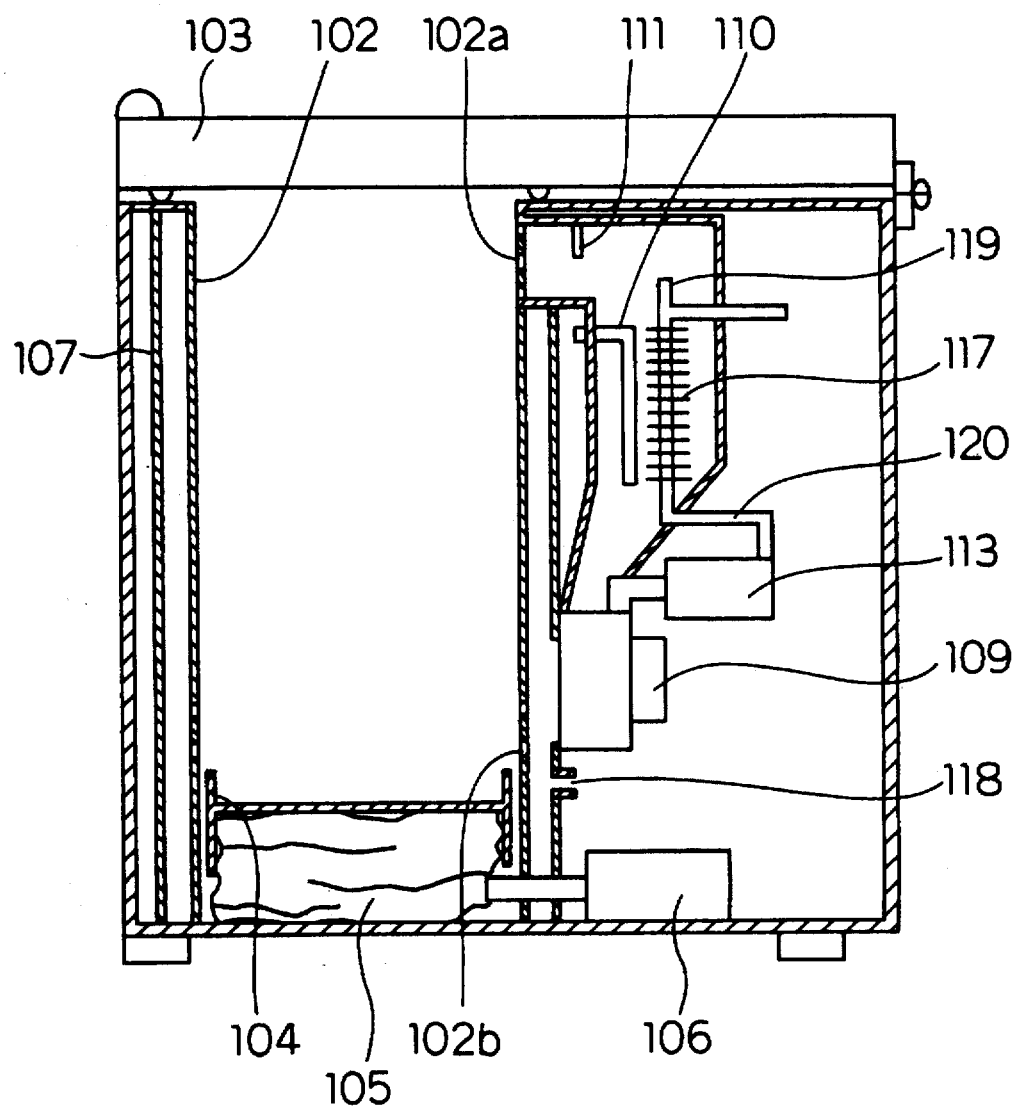
FIG. 8 is an essential longitudinal sectional view of a waste plastics compacting apparatus in other embodiment of the invention.

FIG. 8 shows an essential longitudinal sectional view of other embodiment according to the invention. What differs from FIG. 7 is that a return port 119 opening in the hot air feed route is provided in the exhaust route after passing the catalyst deodorizing unit. This constitution serves to further enhance the heat recovery efficiency.

Figure 9:
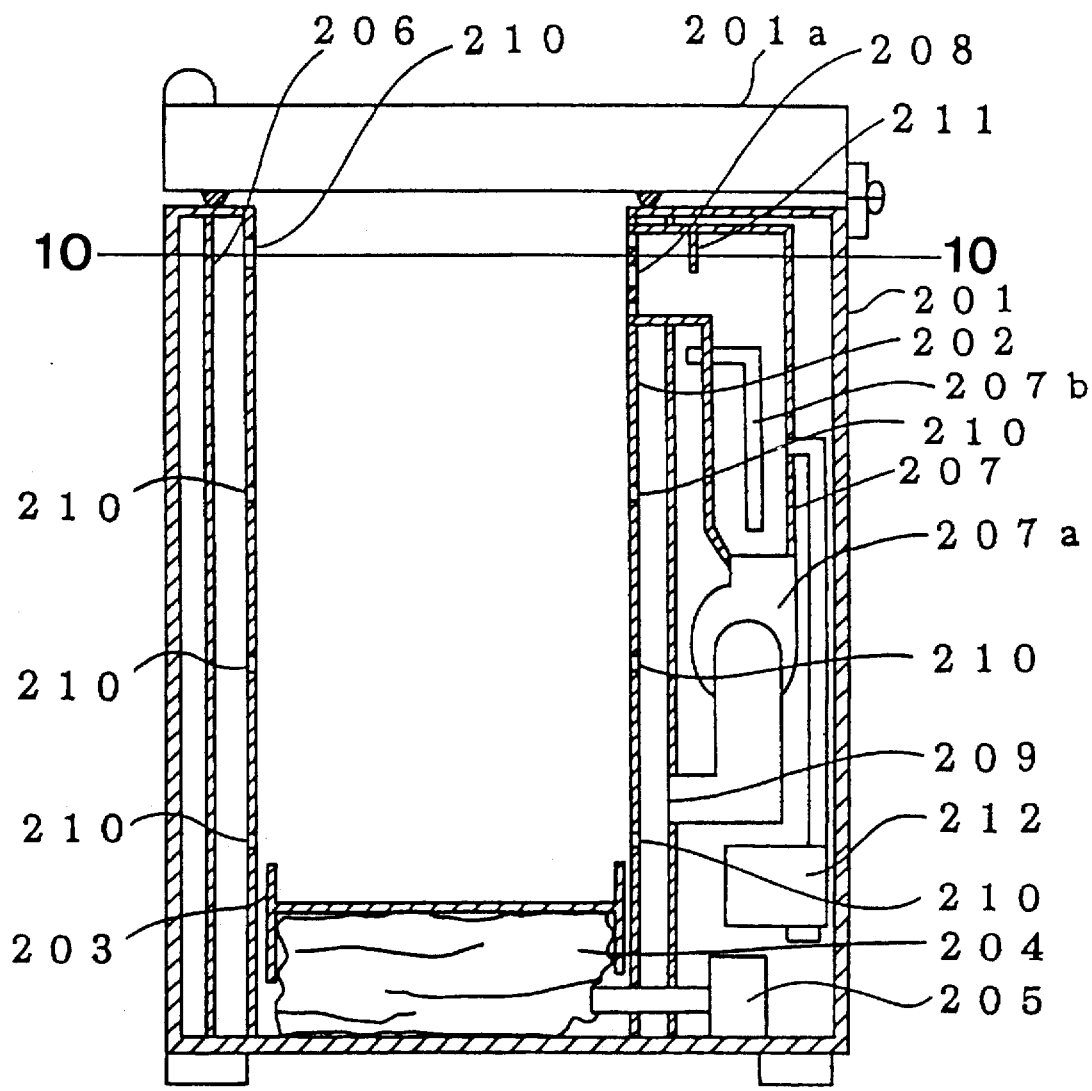
FIG. 9 is an essential longitudinal sectional view of a waste plastics compacting apparatus in other embodiment of the invention.
Figure 10:
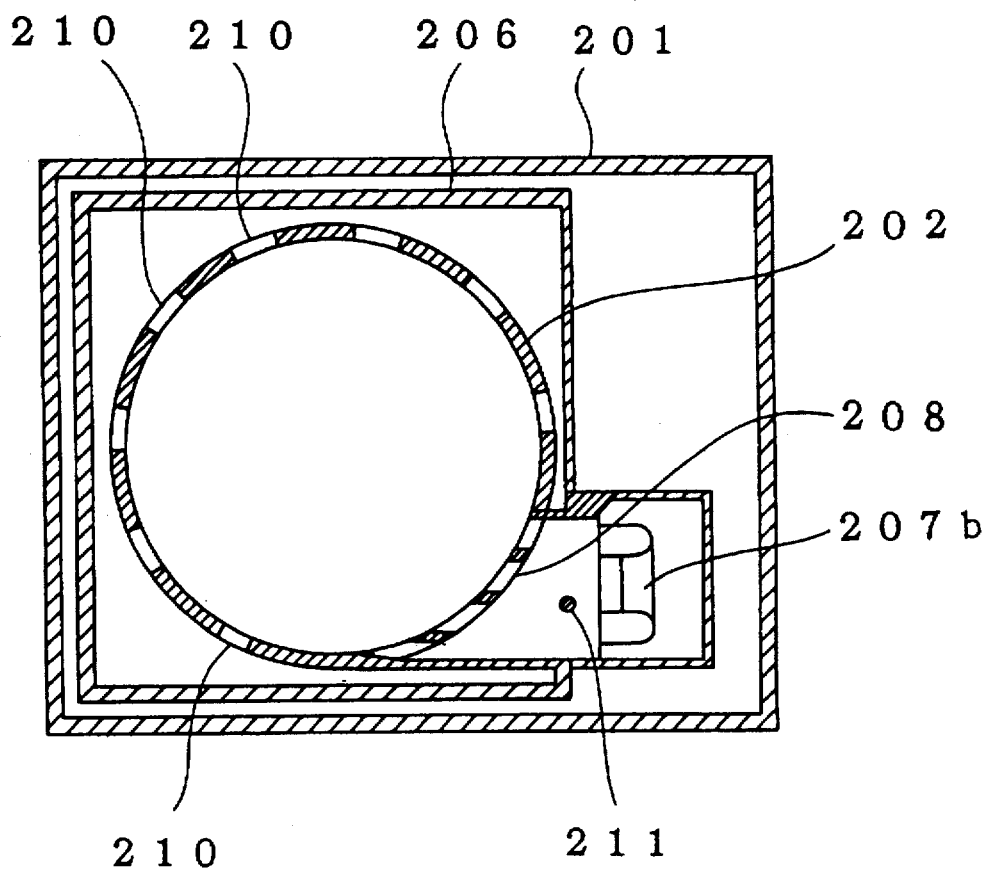
FIG. 10 is a 10—10 sectional view of the waste plastics compacting apparatus in FIG. 9.

FIG. 9 is an essential longitudinal sectional view showing other embodiment of the invention. Reference numeral 201 is a main body, and 201a is a lid for composing a main body container. Reference numeral 202 is an accommodating container of waste plastics, and 203 is a bottom plate provided in the accommodating container. Reference numeral 204 is an elastic and airtight bag, 205 is an air pump for varying the volume of the bag 204, and 206 is an outer container provided between the main body 201 and accommodating container 202. Reference numeral 207 is a hot air generating unit for heating the plastics, and it is composed of a blower 207a of pressure sirocco type or the like for circulating hot air, and a heater 207b. Reference numeral 208 is a first opening as a hot air inlet into the accommodating container 202, and it is provided in the upper part of the side wall of the accommodating container. Reference numeral 209 is a fan suction port provided in the lower part of the outer container 206. At the side of the accommodating container 202, a plurality of second openings 210 for exhausting the sucked hot air into the outer container are provided dispersedly in the vertical direction. Reference numeral 211 is a temperature detector of hot air blow-out temperature. Reference numeral 212 is a deodorizing unit using a platinum derivative oxidizing catalyst branched off from the hot air generating unit 207. FIG. 10 is a sectional view of 10—10 of FIG. 9. The operation is same as in the other embodiments and is omitted. In FIG. 10, in the constitution for blowing out hot air in the tangential direction of the circumference of the accommodating container 202, hot air circulates spirally in the accommodating container 202, and hence uniformity of heating of waste plastics is enhanced. Besides, by heating from the circumferential direction of the accommodating container 202, the waste plastics shrink by heat to concentrate in the central part of the bottom plate 203. Therefore, when raising the bottom plate 203 to compress, the softened plastics hardly get in between the peripheral wall of the accommodating container 202 and the bottom plate 203. Moreover, sine uniform heating is possible, the hot air temperature can be controlled adequately within an arbitrary temperature range. It is also effective to prevent release of internal heat of the outer container 208 between the main body 201 and accommodating container 202.

Figure 11:
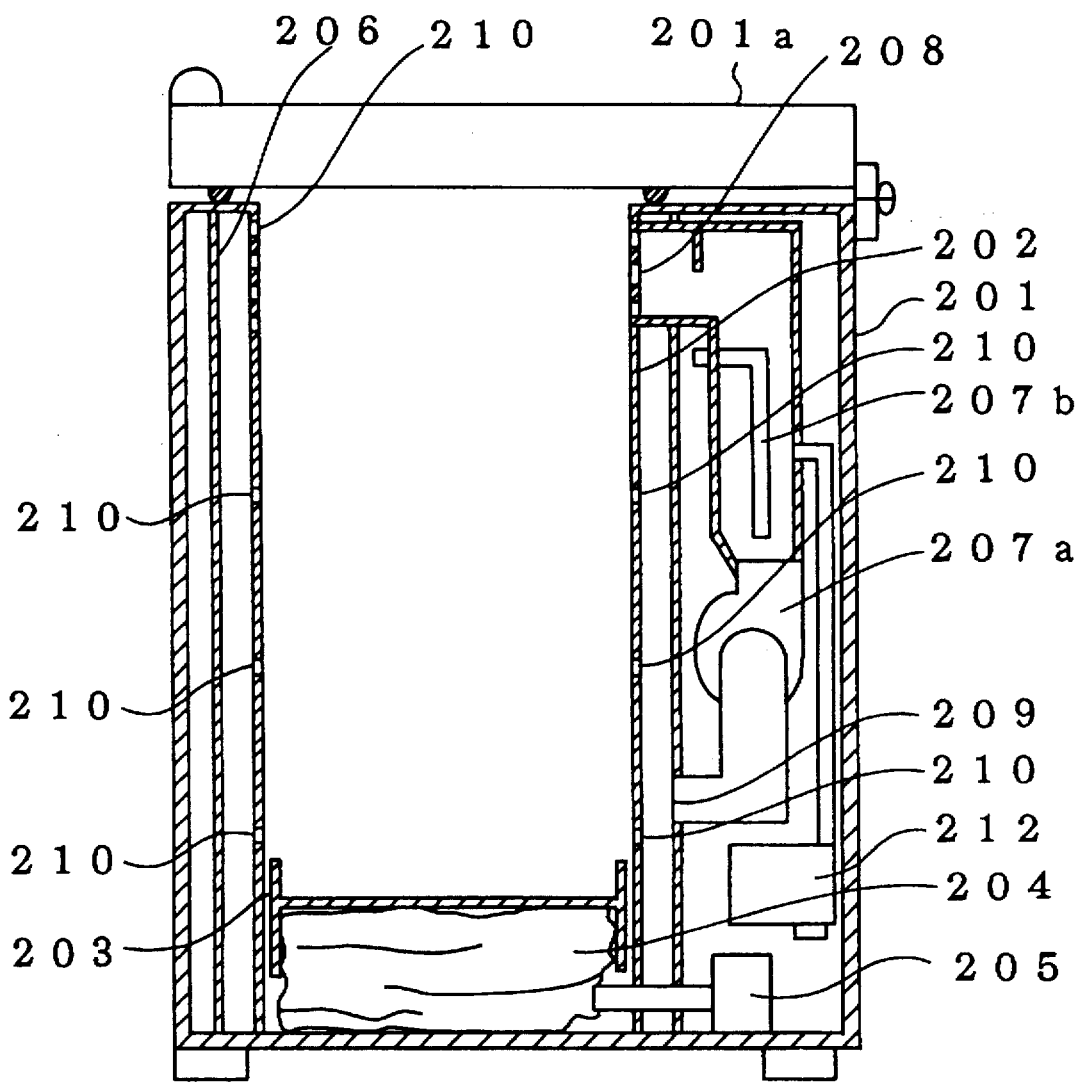
FIG. 11 is an essential longitudinal sectional view of a waste plastics compacting apparatus in other embodiment of the invention.

FIG. 11 is an essential longitudinal sectional view showing other embodiment of the invention. Same constituent parts as in FIG. 9 are not explained in duplication herein. What differs from FIG. 9 is that the rate of opening area provided at the upper side of the accommodating container 202 is greater as compared with the total opening area of the plurality of second openings 210. Parallel to heating action, the air pump 205 is operated to send air into the bag 204 to raise the bottom plate 203, and the volume of the accommodating container 202 is decreased, thereby compressing the waste plastics. This operation is particularly effective for PET (polyethylene terephthalate) bottles. The PET bottle having the crystallization temperature near the glass transition temperature may not be compressed sufficiently when heated for a long time above 110° C. near the glass transition temperature because the noncrystal parts of opening and bottom are crystallized to increase the strength. In such a case, before crystallization is advanced by heating, it is necessary to apply compressive force to plastics. In this apparatus, accordingly, parallel to heating action, compressive action is effected. Accordingly, just before the crystallization of plastics is advanced and the strength is increased, the elasticity is lost and compressive force can be applied in the optimum condition of softened state. In this method, the PET bottles can be sufficiently reduced in volume.

At this time, when hot air inlet and outlet are provided only beneath the accommodating container 202, the hot air inlet (first opening 208) and hot air outlet (second openings) are blocked by the elevation of the bottom plate, and sufficient heating is not expected. Hence, the first opening is formed in the highest part of the accommodating container 202, and the rate of opening area of the second openings 210 provided at the upper side of the accommodating container 202 is set greater in the total opening area of the second openings 210. As a result, the heating effect may be obtained to the maximum extent when compressing. That is, a sufficient hot air passage is maintained even in the final step of compression, and the volume reducing treatment is secure. Moreover, when the first opening provided in the upper part of the accommodating container 202 is arranged in tight contact with the second openings at the position confronting the first opening, hot air may be circulated more uniformly while compressing.

In the waste plastics compacting apparatus of the invention organically combining heating by hot air and compressing by using air pressure described so far, an effective treating method of foamed plastics, especially foamed polystyrene, is described below.

In a series of treating process, just before starting compression, a method of operating a cooling process for a short time is explained. More specifically, as shown in FIG. 4, while operating the blower 7, the heater 7 is turned off. As a result, while the internal temperature of the foamed plastics once heated is nearly kept as it is, only the surface temperature of the lump of foamed plastics can be lowered. Later, compression operation starts. By this cooling process for a short time, adhesion of foamed plastics to the wall of the accommodating container 1 is weakened, and a smooth compression operation is realized. The heating (reaching) temperature of foamed plastics is set in a range of, for example, about 130° C. to 180° C. for foamed plastics, but the surface temperature of foamed plastics just before compression is effective in a range of 100° C. to 130° C. To set the cooling process for lowering to this temperature by the time, time setting depending on the machine structure is necessary because the cooling time varies with the structure (heat capacity) of the machine. Or by detecting the temperature change (fall) detected by the temperature detector 9, the temperature may be controlled within the specified range.

Figure 12:
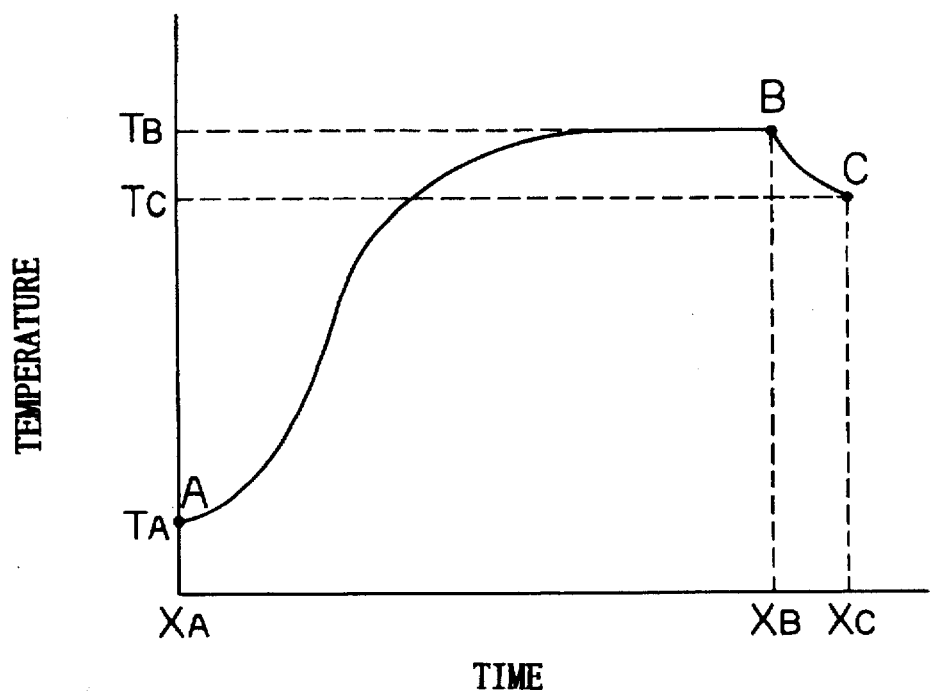
FIG. 12 is a temperature profile diagram for explaining the volume reducing method of waste plastics according to the invention.

The temperature profile of this operation is shown in FIG. 12. The axis of abscissas denotes the treating lapse time, and the axis of ordinates is the temperature detected by the temperature detector. Treatment starts at point A (temperature $T_A$, time $X_{A=0}$), the temperature rises sharply at the time passes, and the control mechanism takes effect as approaching the set temperature $T_B$, and the temperature rise becomes moderate. Then, keeping heating at set temperature $T_B$, when the inside of the foamed plastics sufficiently reaches the set temperature at point B (temperature $T_B$, time $XB$), cooling process starts. Cooling continues up to point C (temperature $TC$, time $XC$), and compression process starts at point C. Transfer from point B to point C is effected by the time setting or temperature setting method as described above in consideration of the characteristic of the equipment.

Other treating method is explained below.

Foamed plastics differ in variety depending on the manufacturing method, foaming factor, etc. In reality, therefore, it is had to specify the composition and quantity of gas generated while heating. It is, at least, definite that most components are organic, and the oxidation method and others used in the invention are effective for purifying. The problem is the quantity, and being organic means being flammable, and depending on the kind of foamed plastics, the concentration in the machine may reach a flammable range during heating. Such risky state must be avoided. It is effective means to feed fresh air to lower the internal concentration, and it is also effective to prevent sudden generation at the same time. One of the methods of preventing sudden gas generation is to control the set temperature in plural steps in the temperature zone of maximum gas generation during heating, so that the foamed plastics in the accommodating container may gradually rise in temperature.

Figure 13:
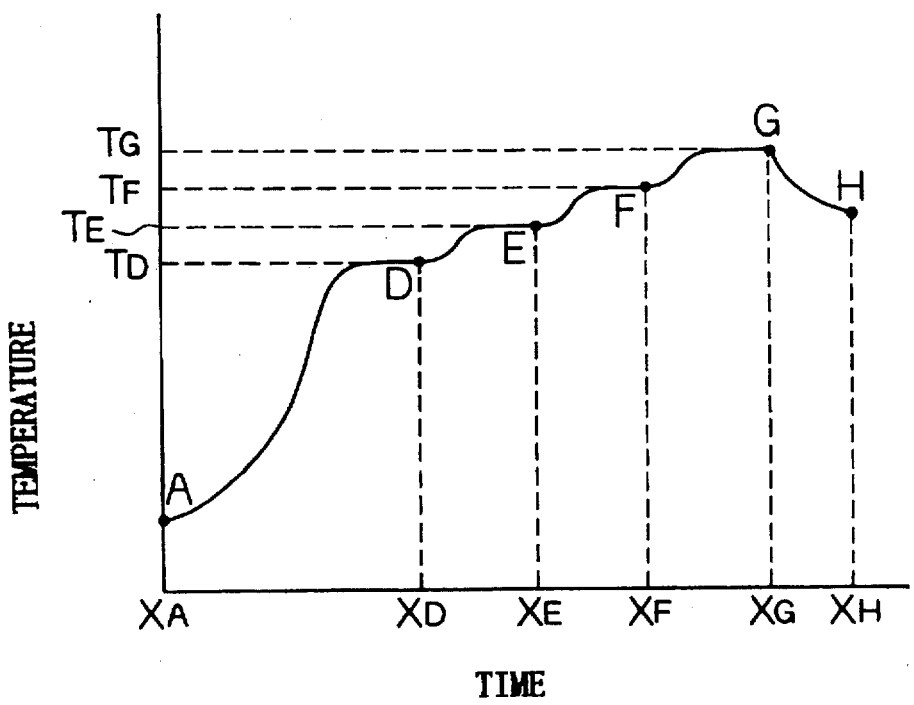
FIG. 13 is a temperature profile diagram for explaining a different embodiment of volume reducing method of waste plastics according to the invention.

This situation is shown in FIG. 13. The axis of ordinates and the axis of abscissas are same as in FIG. 12. In this embodiment, the temperature is raised by controlling the heating set temperature in four steps of $T_D$, $T_E$, $T_F$ and $T_G$. The temperature range is effective, for example, in a range of about 80° C. to 160° C. for foamed polystyrene. Setting at smaller intervals is effective for the purpose, but it leads to longer treating time, and it is preferred to determine appropriately in consideration of the machine performance and other conditions. By this method, the flammable gas concentration in the treating container 3 can be lowered to about ½ to ¹⁄₁₀ of the peak value, and safety in machine operation is assured. Afterwards, from point G to point H, cooling process continues same as in the embodiment in FIG. 12, and compression process starts from point H.

Figure 14:
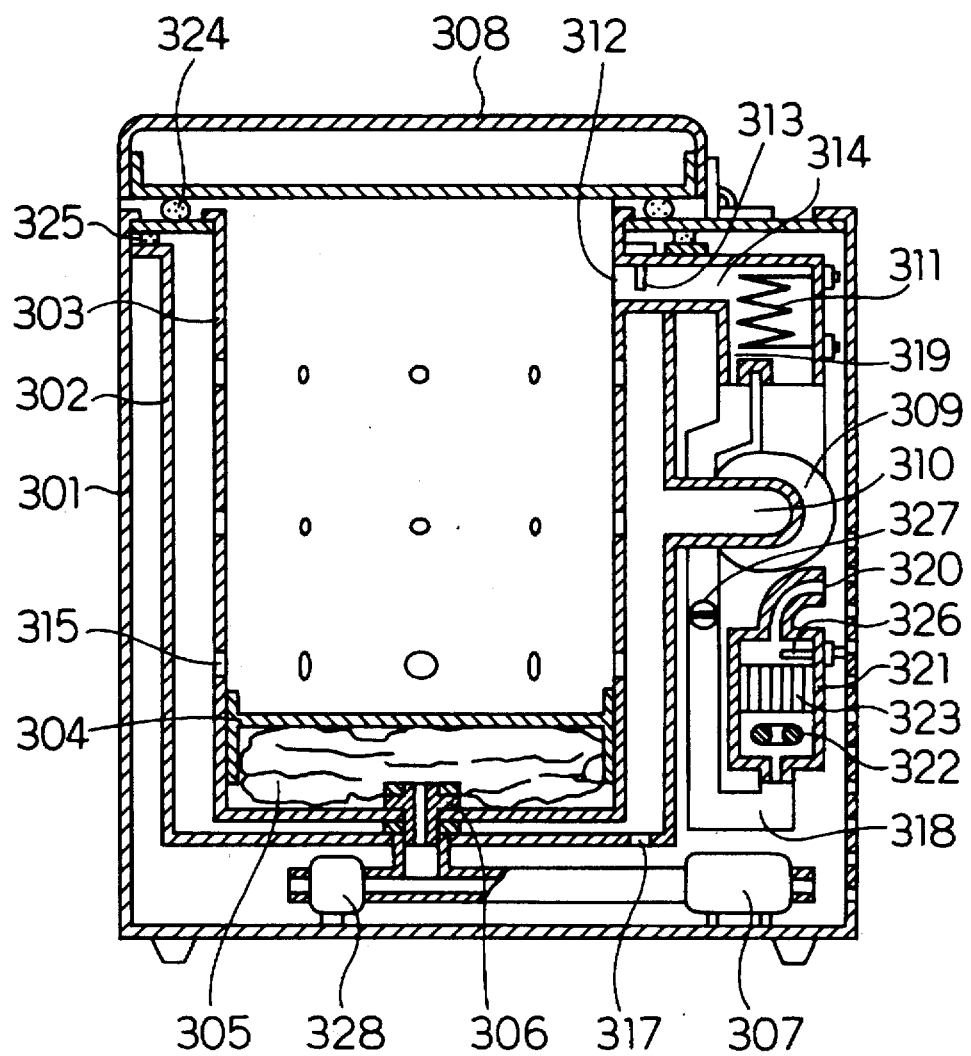
FIG. 14 is an essential longitudinal sectional view of a waste plastics compacting apparatus in other embodiment of the invention.

FIG. 14 shows an essential longitudinal sectional view of a different embodiment of the invention. This embodiment is also intended to realize safe treating operation by suppressing elevation of generated gas concentration in the heating process.

Reference numeral 301 is a main body, 302 is a tubular outer container, 303 is a tubular treating container, 304 is a bottom plate, 305 is an airtight bag, and 306 is a clasp. Moreover, 307 is an air pump and 328 is a solenoid valve. Reference numeral 308 is a lid, 324 is a lid packing, and 325 is a packing for sealing the outer container 302 airtight. At the outer side of the outer container 302, a blower 300 opening an air intake port 310 to the outer container is provided, comprising a heater 311 and a temperature detector 313, and a hot air feed route 314 communicating with a first opening 312 formed at the upper side of the accommodating container 303 is linked. Reference numeral 315 is a second opening, and an exhaust route 318 having a deodorizing unit 321 comprising an oxidation catalyst 323 and catalyst heater 322 is linked to a branching part 319 of the hot air feed route 314. Reference numeral 320 is an exhaust port of the deodorizing unit 321. Reference numeral 317 is a fresh air lead-in port. Reference numeral 327 is a flow rate controller provided in a branch passage 318. B operating it, the flow rate (fresh air flow from the fresh air lead-in port 317) into the deodorizing unit 321 can be adjusted. In this embodiment, therefore, depending on the temperature detected by the temperature detector 313, the flow rate controller 327 is operated to vary the fresh air (diluting air) intake from the fresh air lead-in port 317, or the heating capacity of the hot air generating part of the blower 309 is varied. Since the generated gas volume increases along with temperature rise, the fresh air intake volume is controlled in the increasing direction and the heating capacity in the decreasing direction in order to cancel and balance. More specifically, to increase the fresh air intake volume, the opening degree of the flow rate controller 327 is increased, and to decrease the heating capacity, the input of the heater 311 is lowered or the air feed rate by the blower 309 is lowered. Moreover, depending on the temperature detected by the temperature detector 313, both the intake volume of diluting air and the heating capacity can be varied, which is a most effective manner. In this way, safety is guaranteed in the heating process.

Referring also to FIG. 14, other embodiment is described. As shown in FIG. 14, a catalyst temperature detector 326 is provided for detecting the temperature of the catalysts 323 in the deodorizing unit 321. In this embodiment, the catalyst temperature detector 326 is installed at the downstream side of the catalyst 323, but it may be also provided in the catalyst 323 or in a very close position at the upstream side of the catalyst. The gas generated during heating is branched off from the circulating route of the hot air and is gradually fed into the deodorizing unit 321, and is oxidized (burned) on the catalyst 323. As the flammable gas passing amount (gas concentration at a constant flow rate) increases, heat generation on the catalyst 323 becomes active, and it is detected in a form of temperature rise of catalyst. In other words, it is possible to monitor the flammable gas concentration in the equipment by the catalyst temperature detector 326. Therefore, depending on the detected temperature, elevation of generated gas concentration may be suppressed by a proper method. That is, depending on the temperature detected by the catalyst temperature detector 326, the flow rate controller 327 is manipulated to take in the fresh air (diluting air) from the fresh air lead-in port 317, or the heating capacity of the hot air generating part of heater 311 and blower 309 is varied, thereby achieving the purpose.

The invention therefore provides the apparatus for reducing the volume of waste plastics easily and hygienically by an organic combination of original heating mechanism and compressing mechanism and by an ideal configuration.

According to the compacting apparatus of the invention, the waste plastics are heated over the glass transition temperature, and the volume can be reduced effectively by heat shrinking and compressing. Flammable gas and odor gas components generated during heating of various plastics can be effectively and safely decomposed into harmless matter in the catalyst deodorizing unit. Moreover, by recycling the reaction heat generated when oxidizing the gas generated in the catalyst deodorizing unit in heating of waste plastics, the treating energy can be saved at the same time.

By blowing the hot air into the accommodating container in a proper direction, uniform heating of waste plastics is realized, and the volume can be reduced effectively while preventing crystallization or melting of the material. At this time, further, since the waste plastics shrink so as to gather in the center, the softened plastics are prevented from being caught in between the accommodating container and bottom plate at the time of compression, so that the conventional problems of malfunction during compression process can be solved. Besides, by forming inlet and outlet of hot air at the upper side of the accommodating container, and heating and compressed at the same time, easy-to-crystallize materials (especially PET) can be effectively reduced in volume. Still more, by interposing a cooling process for a short time between heating and compressing, only the surface temperature of softened waste plastics can be lowered, and the surface adhesion becomes weak, so that the waste plastics in the accommodating container can be smoothly compressed and taken out easily, without allowing adhesion to the upper and lower compressing surfaces of the wall of the accommodating container. Moreover, by the temperature rise method in plural steps near the set temperature in heating process, or by making use of the hot air detected temperature or detected temperature of deodorizing unit, sudden concentration elevation of generated gas of foaming agent and others in the heating process can be suppressed, and risk of fire or explosion by ignition can be prevented, so that safe volume reducing treatment is realized.

Odor substances such as styrene monomer can be securely deodorized, and comfortable and pollution-free treatment operation is realized. As a result, the waste plastics can be reduced in volume to about 1/10 to 1/40, and the storage space is saved, and collection and transportation cost is curtailed, and hence it contributes greatly to promotion of recycling of waste plastics.

What is claimed is:

1. A waste plastics compacting apparatus using hot air to soften the waste plastics comprising:

a hot air generating part for generating hot air, said hot air generating part comprising a heater for heating air and a blower for blowing the hot air, accomodating container for accommodating waste plastics and for receiving the hot air, a bottom plate sliding up and down inside of said accommodating container for varying an inner volume of said accommodating container, an inflatable flexible container provided beneath said bottom plate, an air pump connected to said inflatable flexible container for inflating or deflating said inflatable flexible container to raise said bottom plate responsive to inflating and to lower said bottom plate responsive to deflating, an outer container provided outside of, and surrounding, said accommodating container, a lid connected to said accommodating container for allowing for the loading and unloading of the waste plastics into said accommodating container, and a hot air circulation passage for permitting the hot air to flow through the waste plastics compacting apparatus, wherein a first opening is provided in an upper part of the accommodating container, a second opening is provided at substantially the same height of said first opening or beneath it, and said hot air circulation passage is disposed such that the hot air circulates by flowing in from the first opening in the upper part of the accommodating container toward a lower part in the accommodating container, and returning to the blower after once flowing out from the second opening into a hot air return route formed between said accommodating container and said outer container.

2. A waste plastics compacting apparatus of claim 1, wherein at least the second opening consists of plural openings, and said plural openings are distributed downwardly from substantially the same height as said first opening.

3. A waste plastics compacting apparatus of claim 1, wherein all or some of the second openings are formed in the bottom plate of the accommodating container, and at least part of the hot air passes through the second opening of the bottom plate.

4. A waste plastics compacting apparatus of claim 1, wherein a bypass passage for communicating between a positive pressure portion and a negative pressure portion of the hot air circulation passage is provided, and a deodorizing unit is provided on said bypass passage.

5. A waste plastics compacting apparatus of claim 1, wherein a deodorizing unit is provided on a branch route branched off from a first portion of the hot air circulation passage, a downstream side of the deodorizing unit is open to a region outside the waste plastics compacting apparatus, and an air suction port is provided at second portion of said hot air circulation passage.

6. A waste plastics compacting apparatus of claim 5, wherein a downstream side passage of the deodorizing unit opens to an atmosphere through a hot air generating part.

7. A waste plastics compacting apparatus of claim 6, wherein a downstream side passage of the deodorizing unit opens to an atmosphere and the hot air generating part.

8. A waste plastics compacting apparatus of claim 1, wherein a deodorizing unit and a suction blower are provided on a branch route branched off from the hot air circulation route, a downstream side thereof is opened to an atmosphere, and an air suction port is provided in a negative pressure portion of said hot air circulation route.

9. A waste plastics compacting apparatus of claim 1, wherein a bypass passage communicating between a positive pressure portion and a negative pressure portion of the hot air circulation passage, a deodorizing unit and a blower are provided on said bypass passage, and said blower blows out to said positive pressure portion.

10. A waste plastics compacting apparatus of claim 1, wherein the first opening is provided at the upper side of said accommodating container, and at least part of said second opening is provided at the upper side of said accommodating container, and said hot air generating part and said air pump are started simultaneously responsive to said lid being closed.

11. A waste plastics compacting apparatus of claim 10, wherein the upper second opening is disposed at a position confronting the first opening.

12. A waste plastics compacting apparatus of claim 1, wherein hot air generating part heats the waste plastics accommodated in the accommodating container, the air pump compacts the heated waste plastics by varying the inner volume of said accommodating container, and said heater in said hot air generating part is turned off prior to the starting of said compacting in order to cool the waste plastics.

13. A waste plastics compacting apparatus of claim 12, wherein said blower in the hot air generating part is operated prior to the starting of said compacting in order to cool the waste plastics.

14. A waste plastics compacting apparatus of claim 1, wherein said hot air generating part heats the waste plastics accommodated in the accommodating container by operating at a plurality of heating levels, and the air pump compacts the heated waste plastics by varying the inner volume of said accommodating container.

15. A waste plastics compacting apparatus of claim 14, wherein said hot air generating part is turned off prior to the starting of said compacting in order to cool the waste plastics.

16. A waste plastics compacting apparatus of claim 1, further comprising temperature detecting means for detecting hot air, provided in said hot air circulation passage, an exhaust route branched off from said hot air circulation passage, and a fresh air intake port for taking in fresh air into said hot air circulation passage, wherein a volume corresponding to an air volume taken in from the fresh air intake port is exhausted from the exhaust route, and at least one of the fresh air intake volume and the heating quantity by the hot air generating part is varied depending on the detected temperature of the hot air by the temperature detecting means.

17. A waste plastics compacting apparatus of claim 16, wherein the fresh air intake volume increases or the heating quantity of the hot air generating part decreases, as the detected temperature of the hot air increases.

18. A waste plastics compacting apparatus of claim 1, further comprising first temperature detecting means for detecting hot air, provided in said hot air circulation passage, an exhaust route branched off from said hot air circulation passage and having a deodorizing unit containing an oxidation catalyst, second temperature detecting means for detecting the temperature of said deodorizing unit, and a fresh air intake port for taking in fresh air into said hot air circulation passage, wherein a volume corresponding to the air volume taken in from the fresh air intake port is exhausted from the exhaust route, and at least one of the fresh air intake volume and the heating quantity in said hot air generating part is varied depending on the detected temperature of the deodorizing unit by said second temperature detecting means.

19. A waste plastics compacting apparatus of claim 18, wherein the fresh air intakes volume increases or the heating quantity of said hot air generating part decreases, as the detected temperature of the deodorizing unit increases.

20. A waste plastics compacting apparatus using hot air to soften the waste plastics comprising:

a hot air generating part for generating hot air, an accommodating container for accommodating waste plastics and for receiving the hot air, a bottom plate sliding up and down inside of said accommodating container for varying an inner volume of said accommodating container, an inflatable flexible container provided beneath said bottom plate, an air pump connected to said inflatable flexible container for inflating or deflating said inflatable flexible container to raise said bottom plate responsive to inflating and to lower said bottom plate responsive to deflating, an outer container provided outside of, and surrounding, said accommodating container, a lid connected to said accommodating container for allowing for the loading and unloading of the waste plastics into said accommodating container, a hot air circulation passage for permitting the hot air to flow through the waste plastics compacting apparatus, and a deodorizing unit is provided on a branch route branched off from a first portion of the hot air circulation passage, a downstream side of the deodorizing unit is opened to a region outside the waste plastics compacting apparatus, and an air suction port is provided at a second portion of said hot air circulation passage.

21. A waste plastics compacting apparatus of claim 20, wherein a downstream side passage of the deodorizing unit opens to an atmosphere through the hot air generating part.

22. A waste plastics compacting apparatus of claim 21, wherein the downstream side passage of the deodorizing unit opens to the atmosphere and the hot air generating part.

* * * * *